(12) United States Patent
Rogers

(10) Patent No.: US 8,388,291 B2
(45) Date of Patent: Mar. 5, 2013

(54) MAT LOCK PIN

(76) Inventor: Donald Scott Rogers, Lafayette, LA (US)

( * ) Notice: Subject to any disclaimer, the term of this patent is extended or adjusted under 35 U.S.C. 154(b) by 199 days.

(21) Appl. No.: 12/781,968

(22) Filed: May 18, 2010

(65) Prior Publication Data

US 2010/0290863 A1 Nov. 18, 2010

Related U.S. Application Data

(60) Provisional application No. 61/179,050, filed on May 18, 2009.

(51) Int. Cl.
*F16B 21/02* (2006.01)
(52) U.S. Cl. .......................... 411/349; 24/453
(58) Field of Classification Search .................. 411/349, 411/549, 554; 403/348, 349, 353; 24/453, 24/287, 580.1, DIG. 54
See application file for complete search history.

(56) References Cited

U.S. PATENT DOCUMENTS

| | | | | |
|---|---|---|---|---|
| 1,716,963 A * | 6/1929 | Johnston | ....................... | 174/177 |
| 3,123,389 A * | 3/1964 | Biesecker | ..................... | 292/218 |
| 3,220,078 A * | 11/1965 | Preziosi | ........................ | 411/349 |
| 3,956,803 A * | 5/1976 | Leitner | ........................ | 411/349 |
| 4,082,052 A * | 4/1978 | Looks | ............................. | 410/82 |
| 4,948,315 A * | 8/1990 | Limberis | ....................... | 411/349 |
| 5,142,834 A * | 9/1992 | Laclave et al. | .................. | 52/208 |
| 5,548,877 A * | 8/1996 | Nitsche | ........................... | 24/287 |
| 6,722,831 B2 | 4/2004 | Rogers et al. | | |

* cited by examiner

*Primary Examiner* — Flemming Saether
(74) *Attorney, Agent, or Firm* — Law Office of Jesse D. Lambert, LLC

(57) ABSTRACT

A mat lock pin for releasably holding together overlapping mats has an outer body and a rotor rotatably held within the outer body. The outer body is sized and shaped so as to snugly fit within aligned holes in overlapping mats, and is shaped so as to be non-rotational within the holes. The rotor has a central stem and a foot at each end. When the mat lock pin is in place extending through holes in overlapping mats, the rotor feet are at the outermost surfaces of the mats. Rotation of the rotor brings angled surfaces on the rotor feet to bear against the outermost mat surfaces, generating an axial force forcing the mats together. The axial forces forcing the mats together are carried by the rotor, permitting the outer body to be made of relatively low strength, and low cost, material.

6 Claims, 12 Drawing Sheets

MAT LOCK PIN

CROSS-REFERENCE TO RELATED APPLICATIONS

This regular patent application is a non-provisional application of previously filed U.S. provisional patent application Ser. No. 61/179,050, filed May 18, 2009, and claims priority to that application for all purposes.

BACKGROUND

1. Field of the Invention

This invention relates to apparatus used in connection with the formation of mat surfaces used in various settings. More specifically, this invention relates to a device, namely a mat lock pin, used to connect mats or mat features to one another, to form a structural, load-bearing surface, commonly used for roadways, work locations, etc.

2. Related Art

Relatively large, load bearing mats are used in a number of industrial settings to provide a firm surface for machinery, vehicles, etc. While various materials are used to build the mats, in many cases such mats are made of rigid polymeric plastic materials. There is a limit to the size in which such mats can be made, so in order to create a relatively large surface a number of such mats must be joined together. Since the mats are reusable, it is desirable to join the mats in a releasable fashion. The mats are frequently made with lips along one or more edges. Such lips, referred to herein as "mat features" (which may take various other configurations) are overlapped, and holes in the lips of adjacent mat features can be aligned.

It can be appreciated that the mat lock pin must sustain both lateral forces (that is, from the mats tending to move away from one another within the same plane, generally substantially horizontal) and axial forces, which are needed to force the mat features together (literally "squeeze" the mat features together). FIG. 1A is a simple schematic showing the general directions of the lateral (denoted as "L") and axial (denoted as "A") forces as those terms are used in this patent application.

Known prior art fastening devices, for example that disclosed in U.S. Pat. No. 6,722,831 (the '831 patent), do provide both lateral and axial forces, but do so in a different manner than the instant invention. In particular, known prior art fastening devices as disclosed in the '831 patent rely on the body of the fastening device (called a "pin body" in that patent), in conjunction with a footed rod (extending through the pin body) to provide the required axial joining force. This requires that the pin body be of sufficient strength to carry the axial force, resulting from a combination of the size (namely, the cross sectional area) and strength of the material forming the pin body. Suffice to suggest that this prior art design requires a pin body of high strength, resulting from a relatively large cross sectional area and a relatively high strength material. Both of these attributes result in a relatively high cost for the pin body component of the fastening device. In addition, the dimensional requirements for the pin body result in the rod (which extends through the pin body) being limited as to its cross sectional area, therefore a relatively high strength (and high cost) material must also be used for that element of the fastening device to yield the required axial strength.

The present invention addresses certain of the limitations of the known prior art fastening devices.

DETAILED DESCRIPTION OF ONE EMBODIMENT OF THE INVENTION

The present invention comprises a mat lock pin used to join mats together, to form a larger load-bearing surface. Generally, such mats have mat features which comprise panels with lips along one or more edges. Panels are butted up against one another, with the lips overlapping. Holes in the lips are aligned, and as can be appreciated pins inserted through holes in overlapping lips keep the mats connected.

Figure 1:
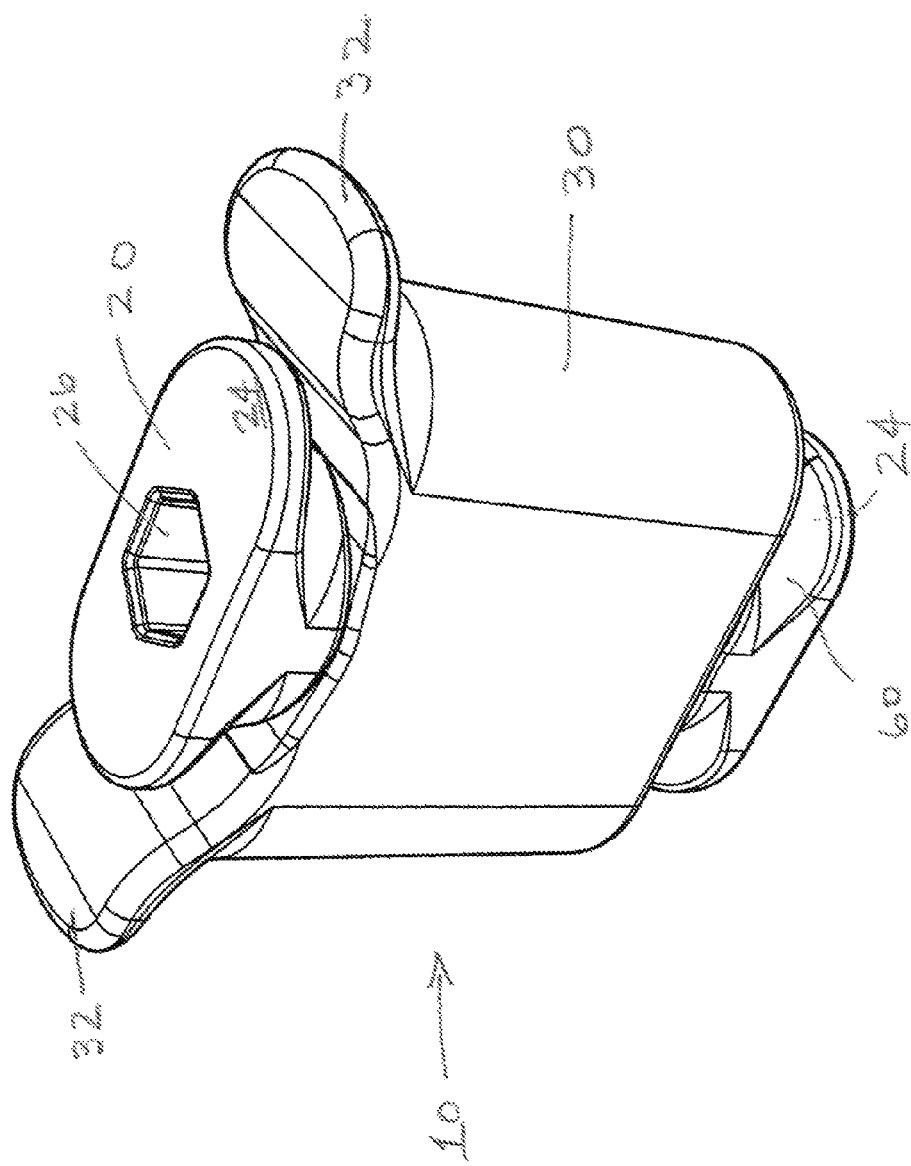
FIG. 1 is a perspective view of one embodiment of the mat lock pin of the present invention.
Figure 1A:
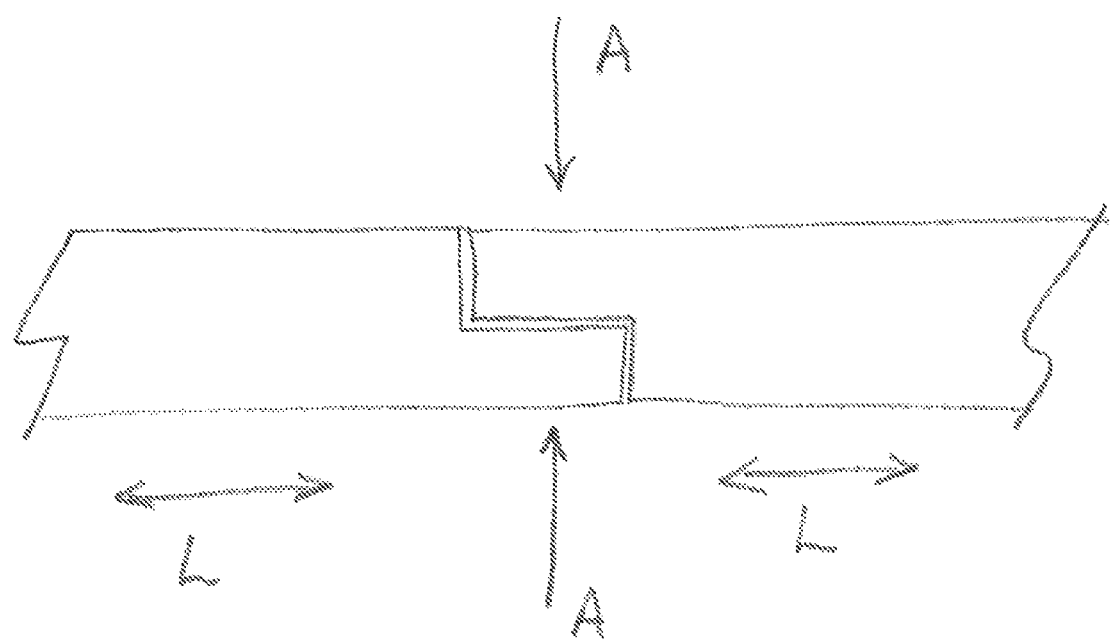
FIG. 1A is a side view illustrating the directions of axial and lateral forces acting on a pair of overlapping mats.
Figure 2:
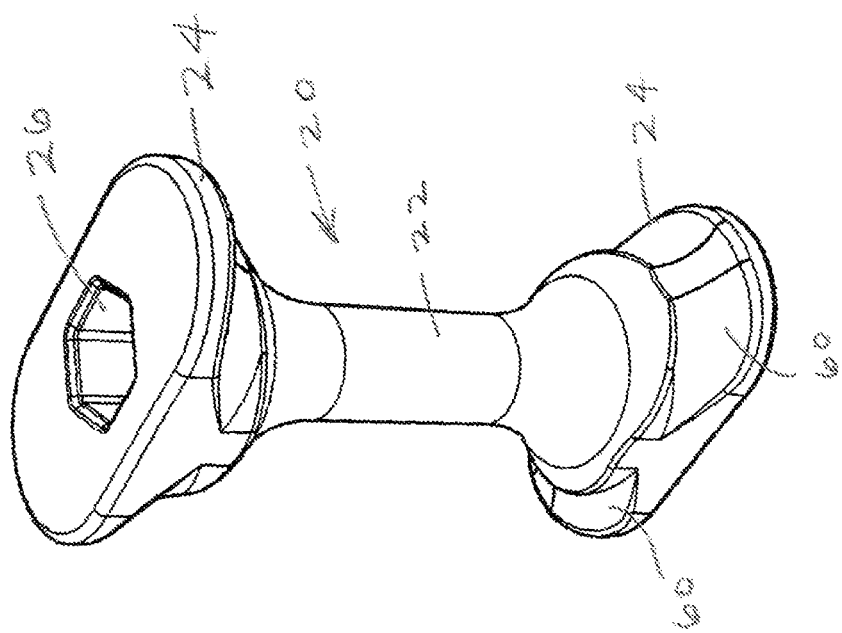
FIG. 2 is a perspective view of the rotor element of the mat lock pin.
Figure 6:
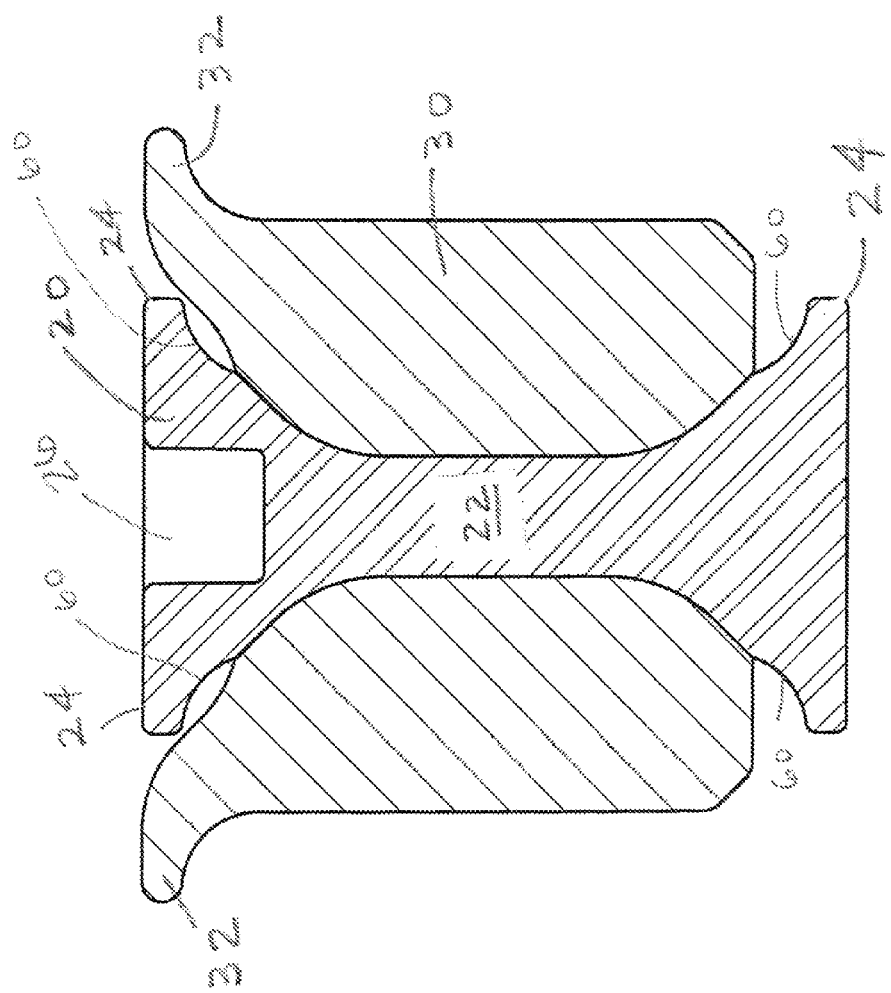
FIG. 6 is a section view of the mat lock pin of FIG. 1.

FIG. 1 is an overall perspective view of one embodiment of the mat lock pin of the present invention. Mat lock pin 10 comprises a rotor 20 and an outer body 30. FIG. 6 is a section view, and shows rotor 20 in place within outer body 30. FIG. 2 is a perspective view of rotor 20 alone (that is, not contained within outer body 30).

Figure 4:
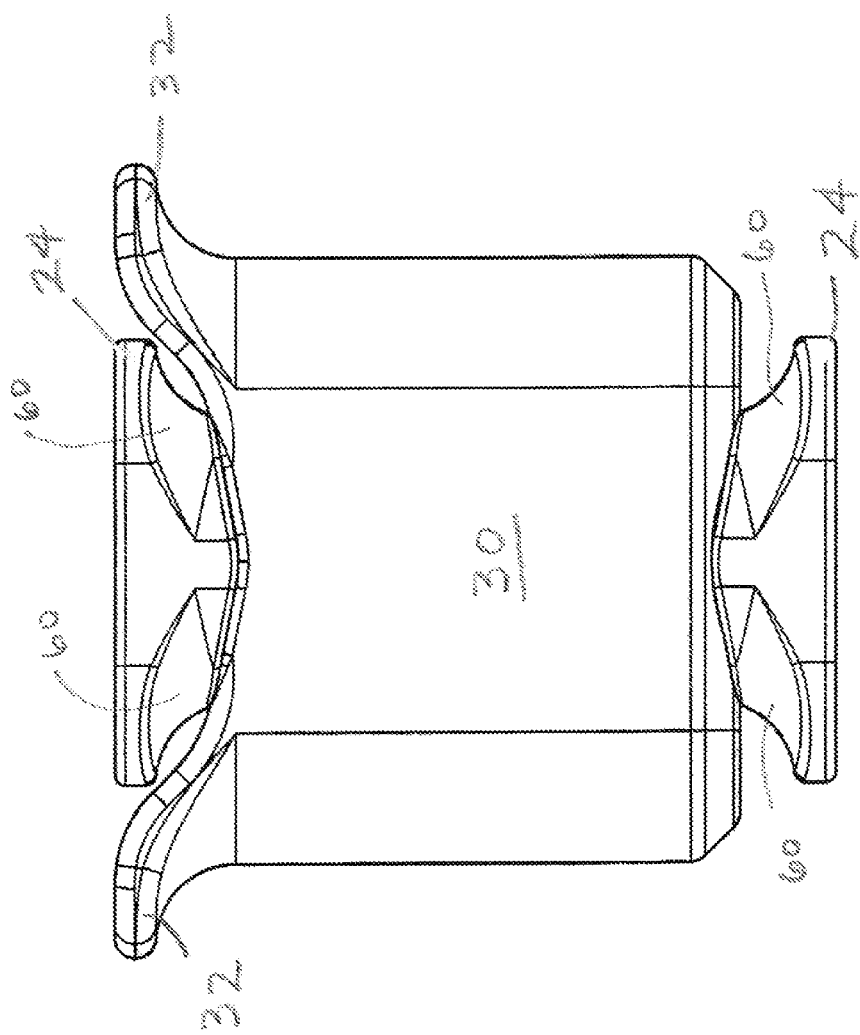
FIG. 4 is a side view of the mat lock pin of FIG. 1.
Figure 5:
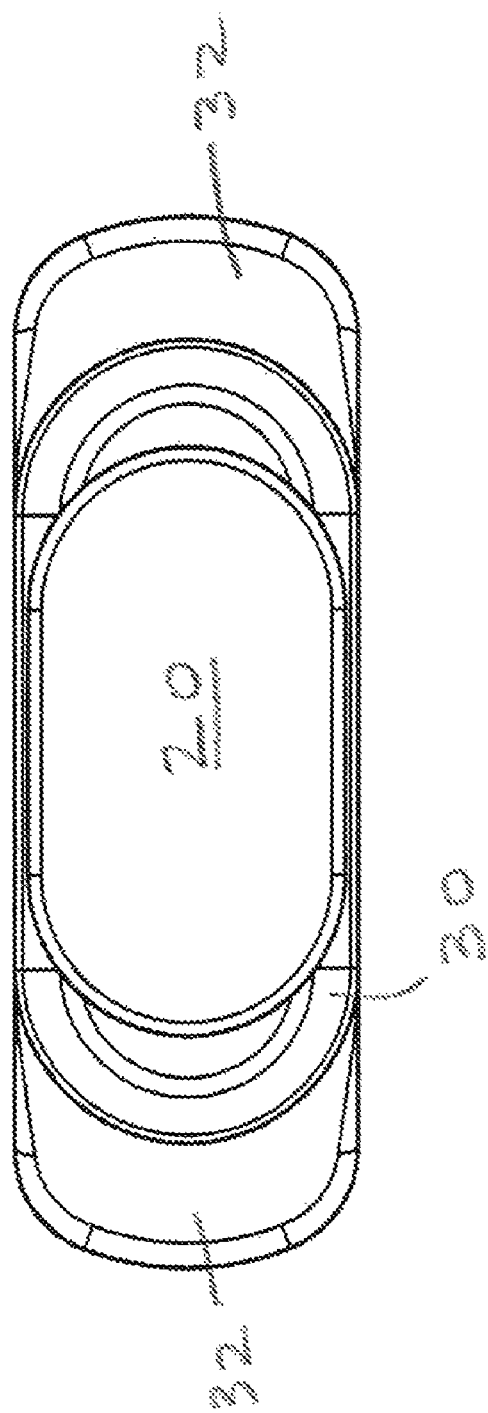
FIG. 5 is a bottom view of the mat lock pin of FIG. 1.

Generally, rotor 20 comprises a stem 22 joining a rotor foot 24 at either end of stem 22. Preferably, both of rotor feet 24 are the same shape and geometry and are disposed generally at right angles to the longitudinal axis of stem 22. One end of rotor 20, namely the upper end as shown in the orientation in the figures, preferably comprises a turning feature to permit a tool (wrench, screwdriver, allen wrench, etc.) to connect to and turn rotor 20. In the drawings, a multi-sided socket 26 is shown, although any number of different configurations could be used, including a screwdriver slot, a hex or other shaped head, etc. As will be described later, rotor feet 24 (in conjunction with stem 22) are the structural elements which serve to lock adjoining mats together, by forcing the mats together. It can be seen (particularly in FIG. 4) that rotor feet 24 generally comprise inclined/angled surfaces 60, which upon rotation of rotor 20 force the mats together, as will be later described.

Outer body 30 is of a shape which substantially fills the typical holes in overlaid mat features, in order to effectively serve as a bushing for rotor 20 during the locking process, as is later described. FIGS. 1-8 shown an embodiment of outer body 30 comprising ear sections or projections 32, which may be provided at one end, typically the upper end of outer body 30, to provide an interference with the mat holes and prevent mat pin 10 from passing through the holes in the mat. In the preferred embodiment outer body 30 has a cross-sectional shape which prevents outer body 30 from rotating in the mat holes. As can be seen from the drawings (e.g., FIG. 3), one embodiment has a rectangular cross sectional shape, preferably with rounded corners. It is to be understood that other cross sectional shapes are possible, e.g. oval or any other suitable shape that reasonably conforms to the mat hole shape and cannot rotate therein.

Materials and Fabrication of the Mat Lock Pin

Mat lock pin 10 may be manufactured by various methods known in the art. In the presently preferred embodiments, mat lock pin 10 is formed by an injection molding process known in the art, namely insert molding of outer body 30 around rotor 20. Rotor 20 is preferably made of a metal, such as alloy steel or stainless steel, or metals such as zinc or aluminum. Rotor 20 may be cast, machined, etc. of such materials, or formed by other processes known in the art. However, it is understood that rotor 20 of the present invention may be made of other materials, including but not limited to plastics.

Once formed, rotor 20 is placed in an injection mold, into which the outer body 30 material is injected so as to form outer body 30 around rotor 20. Various types of materials can be used to form outer body 30 around rotor 20 by injection molding, such as HDPE, other plastics, etc. While injection molding of outer body 30 around rotor 20 is the presently preferred method of fabrication, it is understood that other methods of manufacture may be used. However, it is understood that outer body 30 of the present invention may be made of other materials, including but not limited to metals, and in addition other methods of fabrication may be used.

Figure 3:
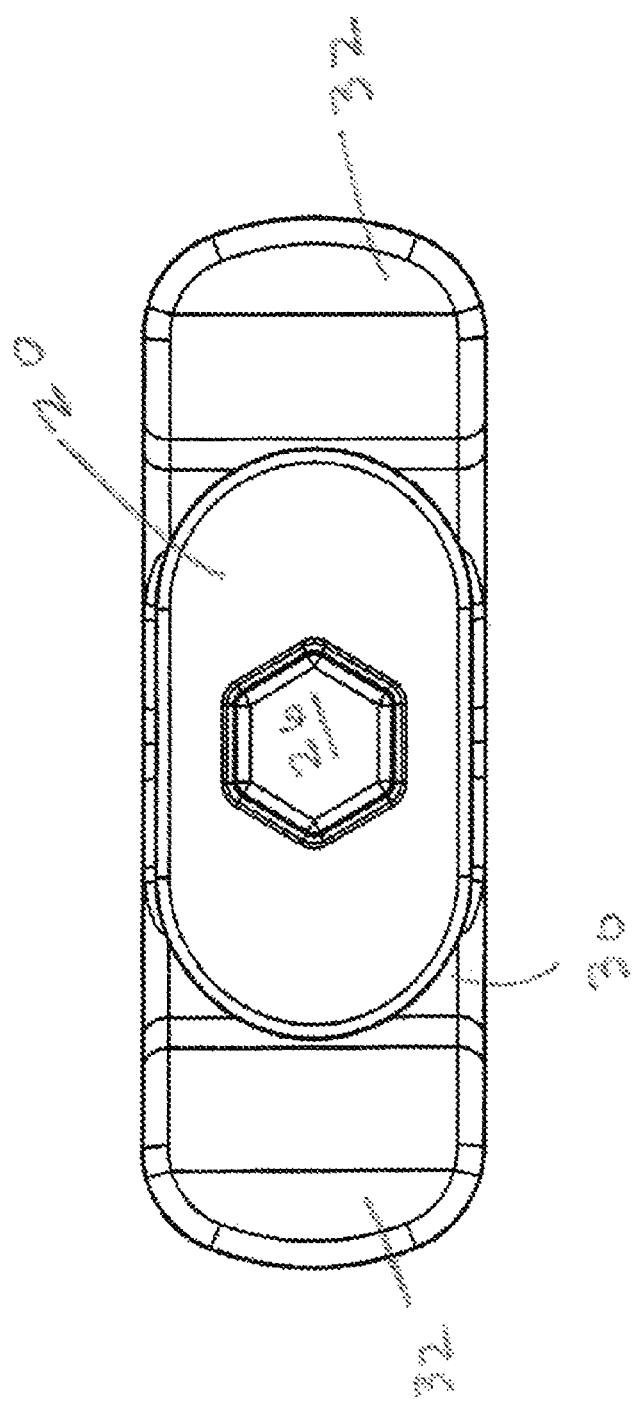
FIG. 3 is a top view of the mat lock pin of FIG. 1.
Figure 7:
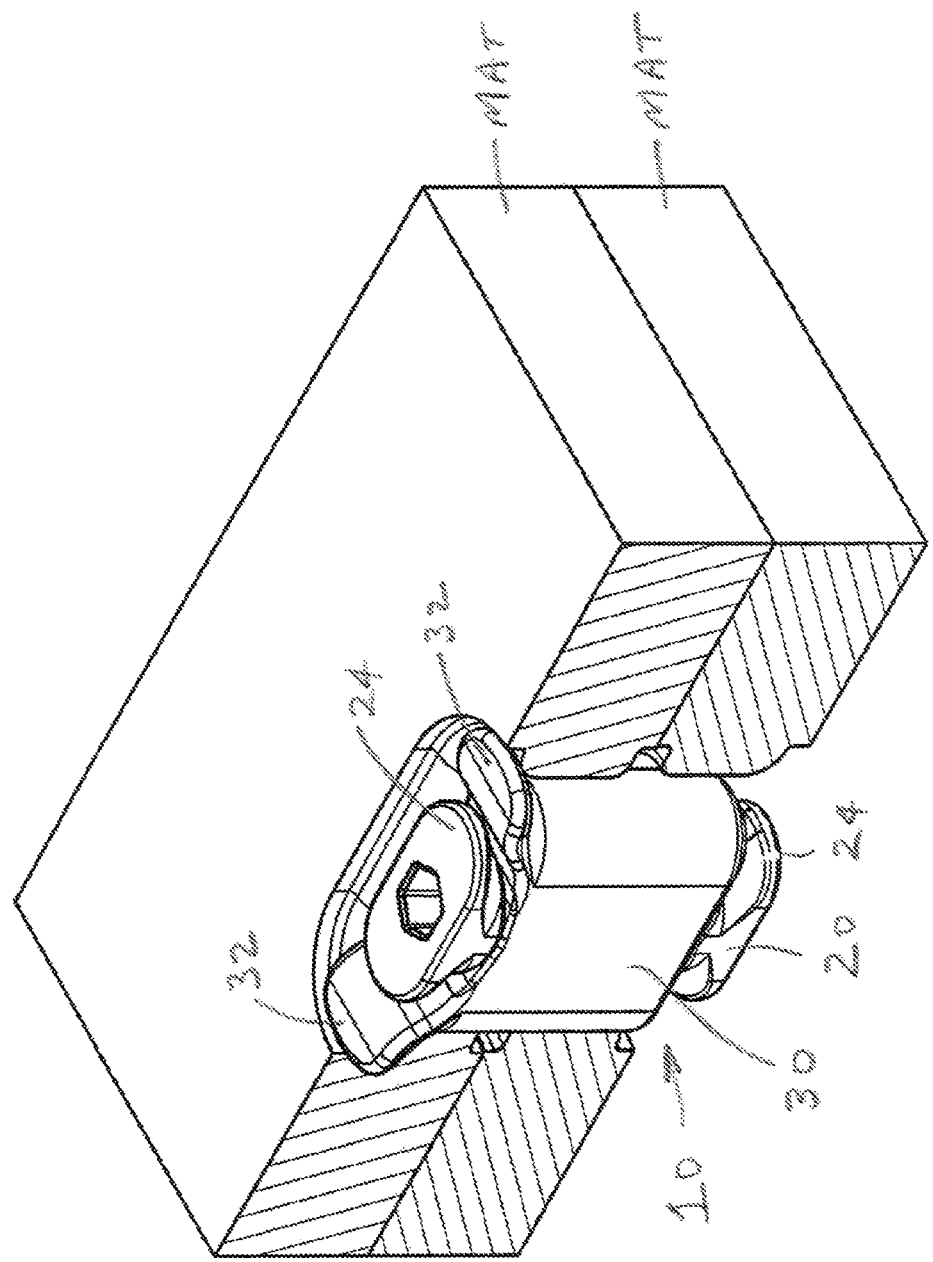
FIG. 7 is a view of the mat lock pin of FIG. 1 in place within a pair of mats, with the rotor in an unlocked position.
Figure 8:
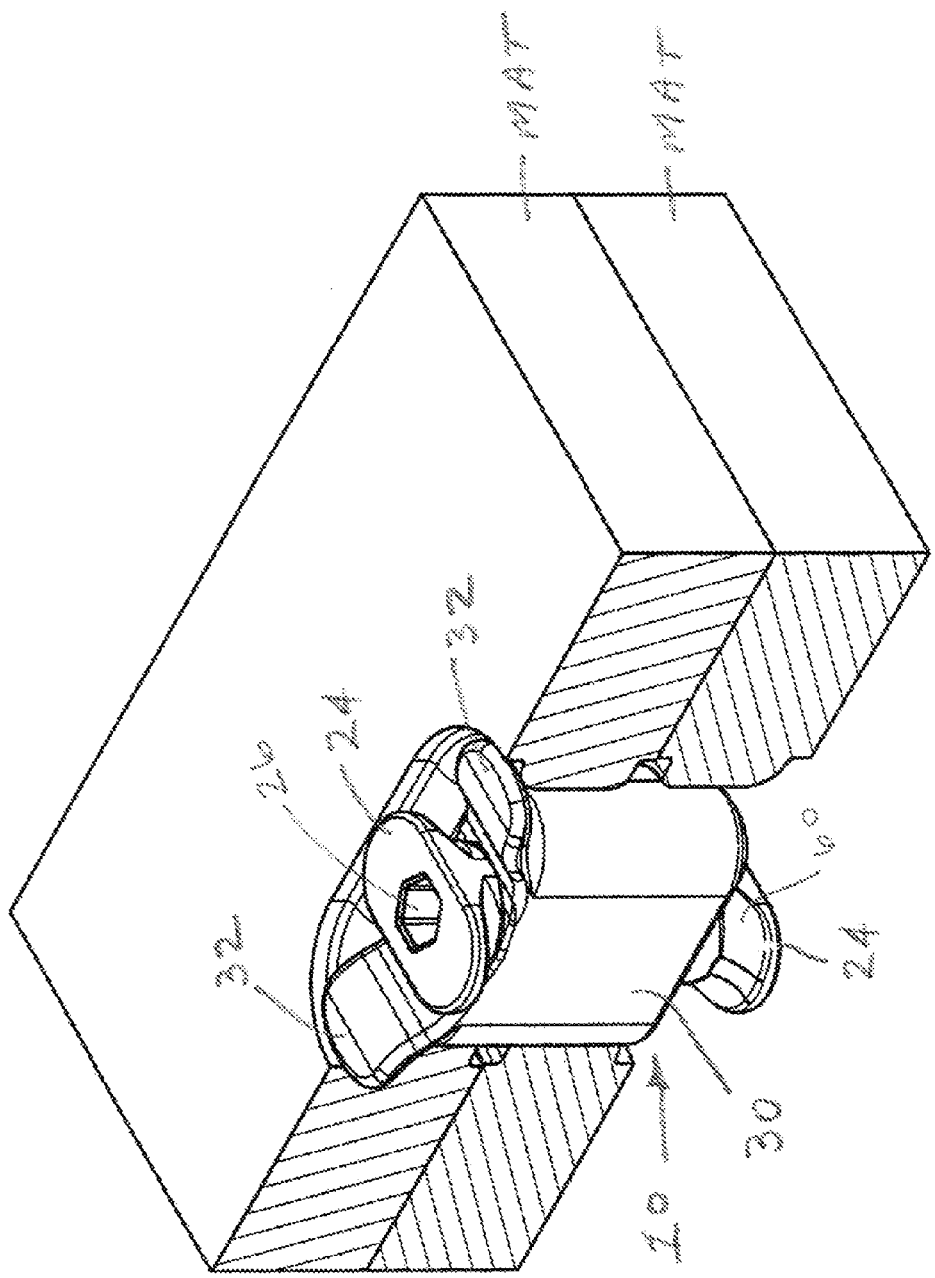
FIG. 8 is a view of the mat lock pin of FIG. 1 in place within a pair of mats, with the rotor in a locked position.

Regardless of fabrication method, it is understood that rotor 20 is rotatably disposed within outer body 30, between an unlocked position as shown in FIGS. 1, 3 and 7, and a locked position as shown in FIG. 8, where rotor feet 24 extend beyond the projected sides of outer body 30 and onto the surface of the mat features proximal the holes in the mat. As described later, this is the position of rotor 20 for locking adjoining mats together.

Operation of the Mat Lock Pin

FIGS. 7 and 8 show mat lock pin 10 in position in holes in the overlapping lip features of adjacent mats. First, mats are positioned so that the holes in overlapping lips thereof are aligned. Mat lock pin 10 is then inserted into a hole, where it extends through at least one, and preferably both, overlapping lips. In the preferred embodiment, outer body 30 substantially fills the area of the hole, and ear sections 32 fit into a depression surrounding the upper outlet of the hole, positioning ear sections 32 substantially flush with the upper surface of the mat. Ear sections 32 thereby prevent mat pin 10 from falling through the hole.

Once mat pin 10 is in place in the hole, it can be seen that the inner surfaces 60 of rotor feet 24 are thereby positioned so as to be near the uppermost and lowermost surfaces of the overlapping lip features of the mats. As seen in FIG. 8, rotor 20 is then turned approximately ninety degrees to a locked position, placing rotor feet 24 beyond the projected sides of outer body 30, and overlapping onto the mat proximal the edge of the hole. As previously described, the inner surfaces 60 of rotor feet 24 comprise angled or inclined surfaces as can be seen in the drawings, and rotation of the rotor brings these angled surfaces to bear against the mat surfaces, generating an axial force and effectively wedging the mats together, in the principle of an inclined plane. It is to be understood that stem 22 has a length suitable to position feet 24, and more particularly surfaces 60, proximal the outermost surfaces of the mats surrounding the holes.

It is to be understood that the particular shape of rotor feet 24 can be varied. It is to be further understood that when mat lock pin 10 is in its locked position, that the entirety of the axial force tending to wedge the mats together is carried by rotor 20. Outer body 30 serves to position and centralize rotor 20 within the mat holes, effectively serving as a bushing therefore, and to assist in withstanding at least part of the lateral loads, thereby assisting in maintaining alignment of the mats. Since the axial forces are carried entirely by rotor 20, outer body 30 can be made of a relatively low strength, and consequently relatively low cost, material, including possibly recycled material content.

Yet another attribute of the present invention is that the elimination of axial forces from being imposed on outer body 30 means that a reduced outer body 30 cross sectional area is possible; this change permits a larger diameter stem of rotor 20 (which is generally made of a higher strength material than outer body 30), and the larger cross sectional area of stem 22 of rotor 20 may permit the use of lower cost metals, such as aluminum and zinc, than are possible with existing prior art designs. Prior art designs permit only a relatively small diameter of the shaft of stem 22, consequently a high strength (and expensive) material is needed.

An Alternative Embodiment of the Mat Pin

Figure 9:
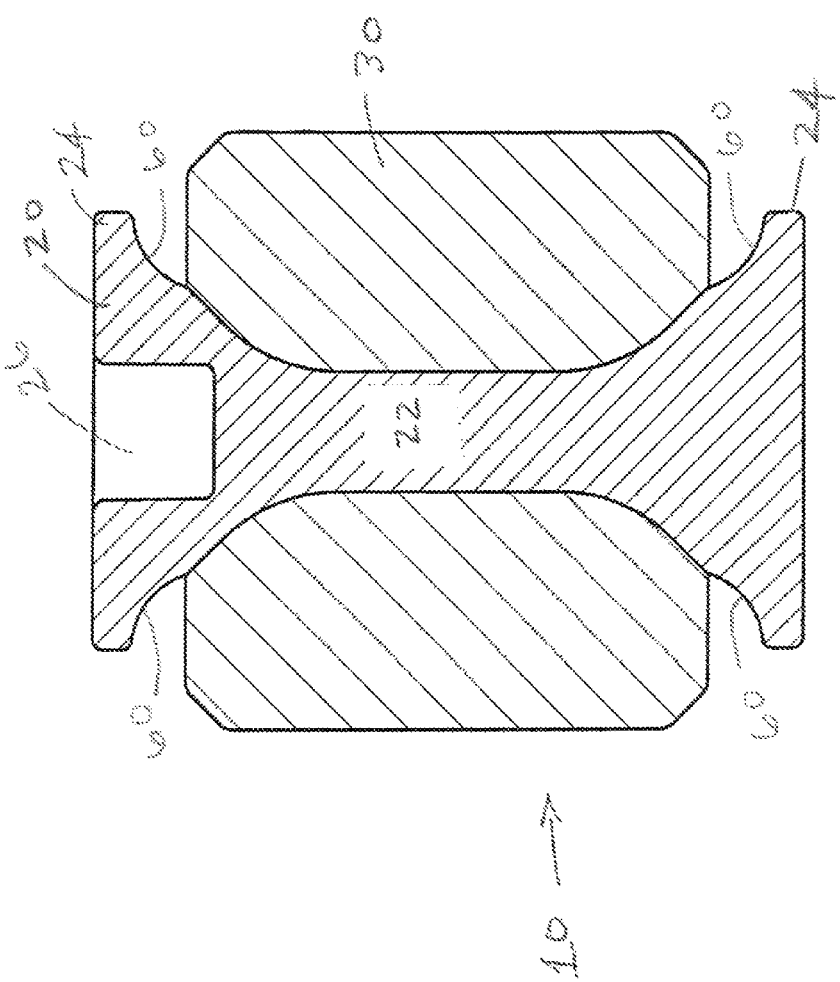
FIG. 9 is a section view of another embodiment of the mat lock pin.
Figure 10:
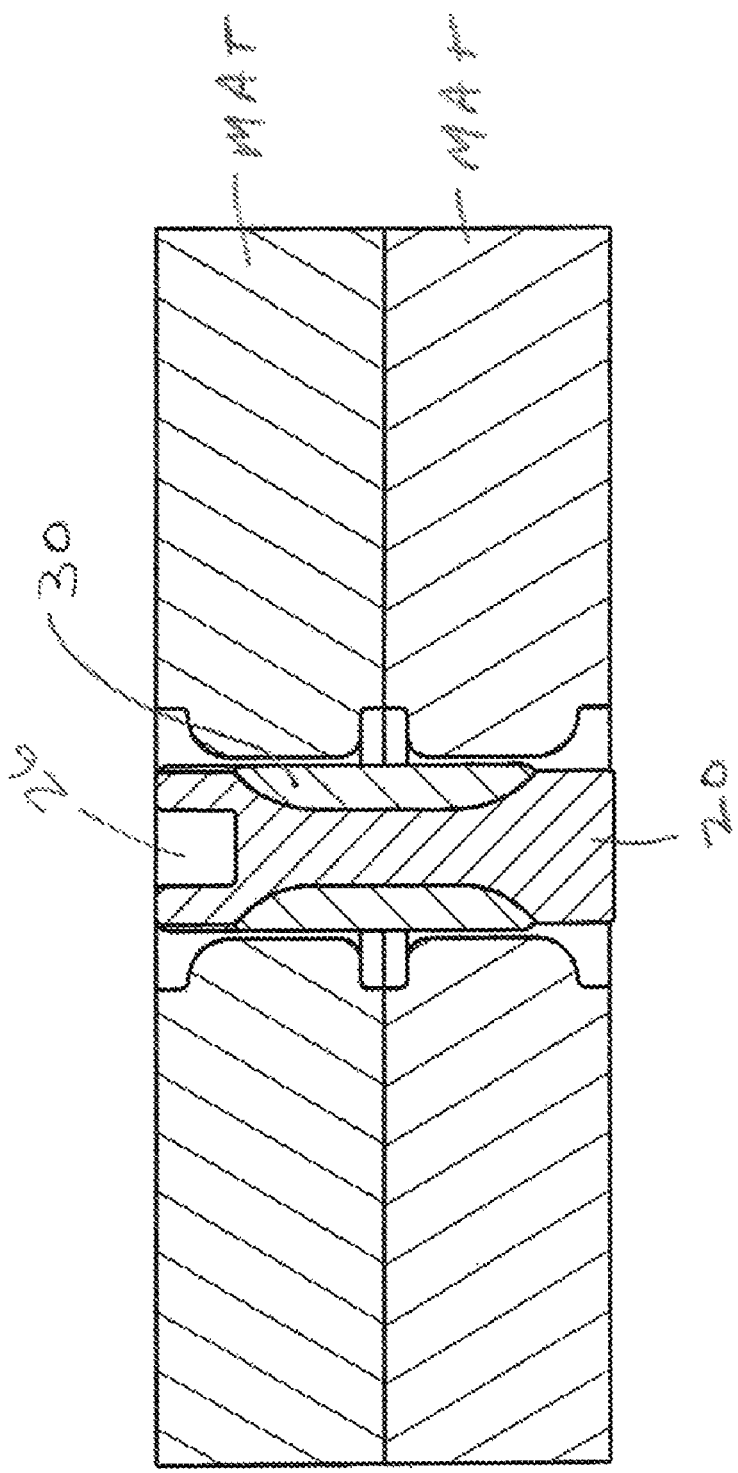
FIGS. 10 and 11 are section views of the mat lock pin of FIG. 9, in place within a pair of mats, with the rotor in an unlocked and locked position, respectively.
Figure 11:
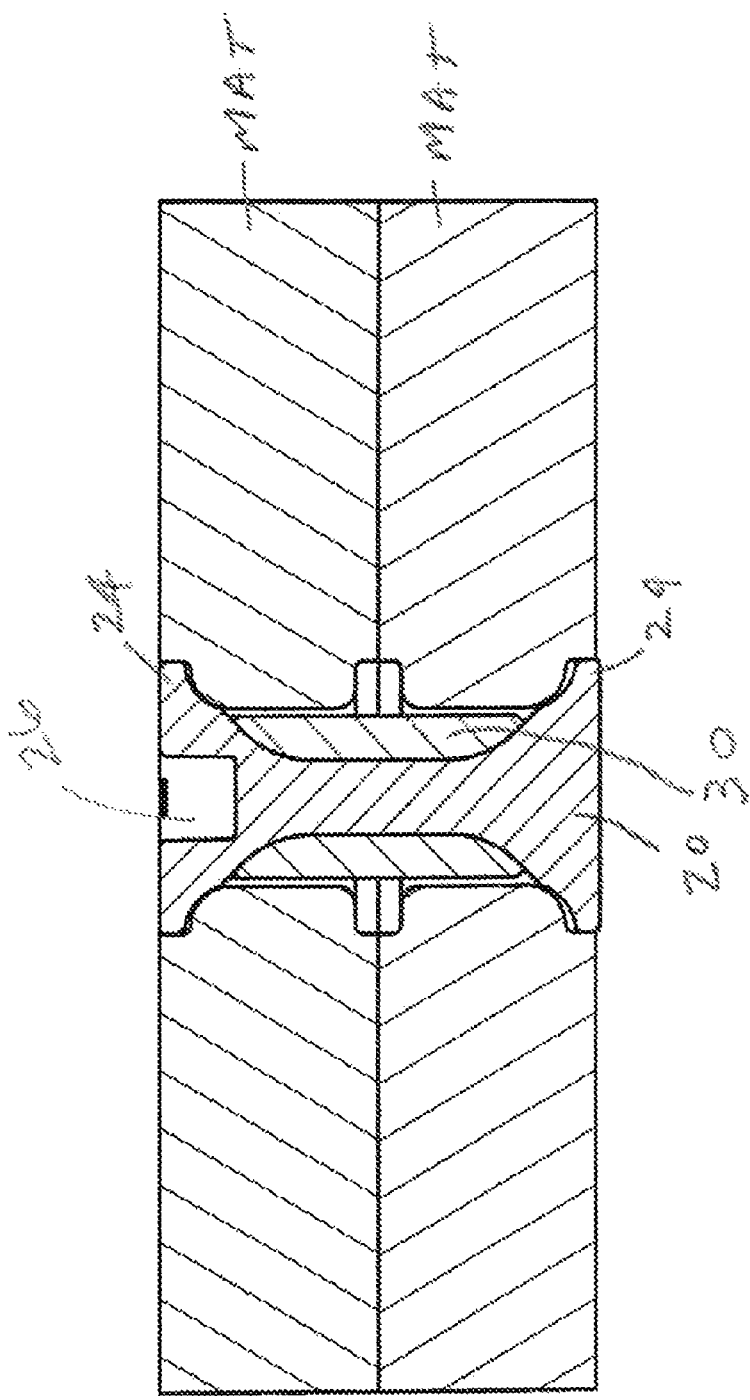

FIGS. 9 through 11 show an alternative embodiment of mat lock pin 10, the primary difference from the previously disclosed embodiment being a change to outer body 30, which in this embodiment does not comprise projections 32 as in the embodiment of FIGS. 1-8. The same element numbers are used for like elements in the two embodiments. FIG. 9 shows a cross section of mat pin 10, with rotor 20 (which may be of the same shape as in FIGS. 1-8) in place in outer body 30, which as can be seen does not have projections 32 at its upper end. FIGS. 10 and 11 show this embodiment of the mat pin, in place in a pair of mats, in unlocked and locked positions.

CONCLUSION

While the foregoing description sets out specificities regarding several presently preferred embodiments of the invention, it is to be understood that various changes may be made to the described embodiments while remaining within the scope of the invention. For example, dimensions of the mat lock pin may be varied to suit particular applications; different materials may be used for both the outer body and rotor; different shapes may be used for the turning feature atop the rotor; and different cross section shapes may be used for the outer body.

Therefore, the scope of the invention is not to be limited by the preferred embodiments disclosed herein, but by the appended claims and their legal equivalents.

I claim:

1. A mat lock pin releasably joining mats, said mats having overlapping portions with aligned holes therein, comprising:
    an outer body having a cross sectional shape to non-rotatably fit within said aligned holes in said overlapping mats;
    a rotor, rotatably disposed within said outer body and comprising a central stem and a foot at each end of said central stem, each foot disposed generally at a right angle to the longitudinal axis of said central stem and forming a T-shape, each foot having a dimension which extends beyond the projected sides of said aligned holes to contact the mat surface surrounding said aligned holes, each foot comprising an inner surface having an inclined surface thereon, said central stem having a length which positions said inner surfaces of said feet proximal the outermost surfaces of overlapping mats.

2. The mat lock pin of claim 1, wherein said outer body comprises projections which prevent said outer body from passing through said hole.

3. The mat lock pin of claim 1, wherein said outer body has a cross sectional shape of a rectangle having rounded corners.

4. A mat lock pin releasably joining mats, said mats having overlapping portions with aligned holes therein, comprising:

an outer body having a cross sectional shape to non-rotatably fit within said aligned holes in said overlapping mats;

a rotor, rotatably disposed in said outer body and rotatable between locking and non-locking positions, said rotor comprising a central stem and a foot at both ends of said stem, each of said feet extending from said stem in a T-shaped configuration, whereby said mat lock pin is disposed in said aligned holes in said overlapping mats, said rotor is rotated into said locking position and said feet are forced against said mats providing axial forces tending to compress said overlapping mats against one another are carried by said rotor.

5. The mat pin of claim 4, wherein said outer body comprises projections preventing said outer body from passing through said holes.

6. The mat pin of claim 5, wherein said rotor feet comprise angled surfaces.

\* \* \* \* \*